United States Patent [19]

Kross

[11] Patent Number: 5,389,390
[45] Date of Patent: Feb. 14, 1995

[54] PROCESS FOR REMOVING BACTERIA FROM POULTRY AND OTHER MEATS

[76] Inventor: Robert D. Kross, 2506 Florin Ct., Bellmore, N.Y. 11710

[21] Appl. No.: 93,809

[22] Filed: Jul. 19, 1993

[51] Int. Cl.$^6$ .................. A22C 21/00; A23L 3/358
[52] U.S. Cl. .................. 426/332; 426/335; 426/644; 426/654; 424/665
[58] Field of Search .......... 426/332, 335, 644, 654; 424/665

[56] References Cited

U.S. PATENT DOCUMENTS 5,185,161  2/1993  Davidson .................. 424/665

Primary Examiner—Helen Pratt

[57] ABSTRACT

A process for removal of bacteria such as Salmonella from fresh poultry and other meats involves contact of the carcass or carcass pieces with an aqueous solution preferably containing about 0.001% to about 0.2% by weight of a metal chlorite and sufficient acid to adjust the pH of the solution from about 2.2 to about 4.5, to maintain the chlorite ion concentration in the form of chlorous acid to not more than about 35% by weight of the total amount of chlorite ion concentration in the solution, and to minimize chlorine dioxide generation and associated discoloration of the meat. Preferred acids are selected such that, when mixed into a 0.1% by weight sodium chlorite solution to adjust the pH to about 2.95 and held for 30 minutes at about 25° C., no more than about 2 ppm chlorine dioxide are generated. In some embodiments, preferred acids are strong inorganic acids such as phosphoric, hydrochloric or sulfuric acid. Preferred metal chlorites are alkali metal chlorites such as sodium or potassium chlorite. The meats are dipped in and/or sprayed with the solution, which may optionally contain food-grade wetting or thickening agents.

24 Claims, No Drawings

5,389,390

PROCESS FOR REMOVING BACTERIA FROM POULTRY AND OTHER MEATS

TECHNICAL FIELD

This invention relates to a process for the removal of microorganisms such as Salmonella from poultry and other meats.

BACKGROUND OF THE INVENTION

Fresh meat products, including poultry, are susceptible to contamination by microorganisms that contact meat surfaces immediately after slaughter and evisceration, where organisms in the intestinal tracts can be transferred to other organs during processing. Contaminating microorganisms include bacteria such as Salmonella and Campylobacter species, Listeria monocytogenes, Escherichia coli and other coliforms, and other enteric organisms. Once bacteria such as Salmonella contact tissue surfaces, they rapidly attach and are difficult to remove even with chlorine disinfectant permitted for use in poultry sprays and chill tanks. In beef processing, a particularly virulent strain of E. coli denoted 0157:E7 was reported to contaminate hamburger meat sold by a fast-food chain and to cause several deaths in the U.S. in 1993. Food poisoning from other organisms such as Listeria and Campylobacter or from spoiled meats in general are intermittently reported in the public press.

The problems created by Salmonella bacteria in poultry products are particularly noteworthy. Currently, Americans spend approximately $20 billion annually on poultry products, consuming about 80 pounds per capita. Approximately 35% to 45% of poultry reaching U.S. consumers is contaminated with Salmonella species. Improper cooking and physical transfer of the bacteria to food handling surfaces and thence to other foods result in the spread of the microorganisms, causing gastrointestinal disorders and, in some cases, death.

Breeders, hatcheries, feed ingredient suppliers, farms, processors, and distributors have all been implicated as contributors to Salmonellae contamination in chickens and turkeys (Villarreal, M. E., et al., J. of Food Protection 53: 465–467 (1990)). Contamination of but a few birds can lead to broader range contamination of other birds and cross-contamination to carcasses. Bacterial proliferation and other signs of spoilage can be delayed by refrigeration, but there is a limit to the degree of refrigeration that can be imposed on meat products, short of freezing the meat, and some bacteria such as psychrophiles can survive and even flourish at temperatures approaching the freezing point. It is thus preferable to control and destroy Salmonella and other microbial contaminants during processing to reduce the initial number of organisms on the meat.

Poultry processing is similar to the processing of other meat animals. Briefly summarized, caged birds arrive by truck at the processing plant. The birds are hung by their feet on shackles in a dressing line, stunned and bled via throat cuts. After bleeding and while still hung, the birds are scalded, plucked and transferred to an evisceration line, where they are manually or mechanically eviscerated, inspected and spray-washed. The spray may contain chlorine as a disinfecting agent. The last step of the process is chilling in a chill tank, by movement through a counterflow of cold water. The carcasses must reach an internal temperature of 5° C. or below, which usually takes about 45 minutes to one hour in a typical many-thousand gallon tank. After reaching this temperature, the carcasses are packaged or further cut into parts, and refrigerated or frozen.

Salmonella and other organisms can survive the scalding process, which involve temperatures of about 50° to 58° C. Though cross-contamination can occur during any stage of processing, the major problems arise during and after evisceration when microorganisms are freed from the intestinal tract and transferred to other tissue surfaces. When carcasses are placed in the chill tank, organisms and unremoved viscera and visceral contents enter the water and can come in contact with other carcasses.

The U.S.D.A. and F.D.A. allow the use of chlorine in the water, up to 50 parts per million (ppm), to destroy some of these organisms. Upper range chlorine levels transfer to the air and can irritate factory workers, so lower levels, e.g., 20 ppm, are typically employed. This compromises antimicrobial effectiveness, as does organic matter and debris that accumulate in water and consume available chlorine. Indeed, even the upper allowable chlorine levels cannot eliminate or significantly reduce pathogenic organisms. In addition, chlorine in process waters has a tendency to react with a variety of organic materials, both from water and from poultry, to form a series of chloro-organic molecules, including species, e.g., trihalomethanes and chloramines, that have been implicated as mutagens and carcinogens.

Chlorine dioxide, which is less reactive with water components such as ammonia and nitrogen compounds, has been considered as an alternative disinfectant to chlorine in poultry processing. Chlorine dioxide can significantly reduce Salmonella and other unwanted microbial contaminants of meat surfaces, and at levels in water which are approximately one-seventh of that required for chlorine to achieve comparable effects.

Though chlorine dioxide has also been found to react with fewer amino acids than does chlorine (3 rather than 18), there is increasing evidence that the reactions cause undesirable effects on poultry surfaces. For example, it has been observed that chlorine dioxide, at the 1.4 ppm level in chiller water, was effective in reducing many bacteria and caused no detectable off-flavors on treated broilers, but the skin of the chickens was lighter in color than control carcasses, and the normal pinkish-white appearance had changed to grayish-white. Use of chlorine dioxide was curtailed in poultry processing as a result of sporadic retail complaints about "bleached" or old-looking carcasses. Moreover, subsequent chlorine dioxide experiments resulted in periodic episodes of severely discolored (blue-black) birds and random poor bacteriocidal efficacy.

Color changes occur from a combination of the oxidation of blood hemoglobin to methemoglobin, the oxidation of caretenoid colorants in poultry fat, and the reaction of chlorine dioxide with the amino acids tyrosine and tryptophan to form colored species. As a small molecule, chlorine dioxide can diffuse into tissues such as capillary walls and fat to effect oxidative changes. Similar color changes were noted by Villarreal, cited above, who studied the effect of slow-release chlorine dioxide levels on Salmonella levels in turkeys. While a major reduction in Salmonella organisms was observed, a bleaching of the skin was noted, especially on the wings and breasts of the carcasses. Skin areas like the neck exhibited a pale brownish color.

Irradiation has been approved by the U.S. government as an alternative antimicrobial treatment. However, irradiation appears to be not viable for most poultry processors due to the high capital plant cost, high operating costs, and the additional cost of transporting carcasses to such facilities. Irradiation may also pose occupational risks to poultry factory workers.

Therefore, it would be desirable to have an effective process for removing Salmonella and other unwanted microorganisms from meat carcasses such as poultry.

SUMMARY OF THE INVENTION

It is an object of the invention to provide a method for removing microorganisms from animal carcasses and fresh meat products.

It is a further and more specific object of the invention to provide a method for efficaciously removing microorganisms including Salmonella from poultry carcasses and carcass pieces during processing without discoloring the meat surfaces.

These and other objects are accomplished by the present invention, which provides a composition and method for removing microorganisms from poultry or meat carcasses or carcass pieces by contacting the carcass or carcass pieces with an aqueous solution containing about 0.001% to about 0.2% by weight of a metal chlorite and sufficient acid to adjust the pH of the solution to about 2.2 to about 4.5, to maintain the chlorite ion concentration in the form of chlorous acid to not more than about 35% by weight of the total amount of chlorite ion concentration in the solution, and to minimize the degradation of that chlorous acid through the formation of chlorine dioxide generation.

Alkali metal chlorites such as sodium or potassium chlorite or a mixture of these are preferred; sodium chlorite is used in one embodiment. The acid is selected to generate no more than about 2 ppm chlorine dioxide when mixed into a 0.1% by weight aqueous sodium chlorite solution to adjust the pH to about 2.95 and held for 30 minutes at about 25° C. Strong inorganic acids such as hydrochloric acid, sulfuric, or phosphoric acid or mixtures of these are preferred in some embodiments.

The solution of the invention is used as a dip or as a spray, or as a combination of these applications. In a typical method for disinfecting poultry carcasses or poultry carcass pieces, for example, the carcasses or pieces are washed after evisceration, immersed in a chilling tank and then removed from the tank. An optional wash of the carcasses or pieces may follow these processing steps. In the practice of the invention, the carcasses or carcass pieces are contacted with disinfectant solution during the initial washing after evisceration, during the chill tank immersion period, or during a spray wash after removal from the chill tank. The disinfectant solution of the invention may also be used in more than one of these processing steps.

A food-grade wetting agent such as an alkylphenoxypoly(ethylene oxide), a poly(ethylene oxide/propylene oxide) block copolymer, an alkylbenzene sulfonic acid, a dioctylsulfosuccinate, and mixtures of these may be added to the solution to facilitate contact with the meat surfaces. The solution may also contain effective amounts of a food-grade thickener, preferably one sufficient to achieve a final solution viscosity of from about 5 cps to about 50 cps at room temperature, for spray applications.

Aqueous solutions containing about 0.002% to about 0.15% by weight metal chlorite and having a pH of about 2.4 to 3.2 are especially preferred for certain applications. In one embodiment wherein the poultry carcass or pieces are contacted with solution at the end of processing, the solution contains about 0.05% to about 0.1% by weight chlorite ion and has a pH of from about 2.6 to about 3.2. In another embodiment, the poultry carcass or pieces are contacted with a solution in a chill tank, and the solution contains from about 0.002% to about 0.02% chlorite ion and has a pH of from about 2.8 to about 3.2. In yet another embodiment, the poultry carcass or pieces are contacted with disinfecting solution shortly after evisceration, when the solution contains from about 0.075% to about 0.35% by weight chlorite ion and has a pH of from about 2.4 to about 3.0.

DETAILED DESCRIPTION OF THE INVENTION

This invention is based upon the finding that the high bacteriocidal effectiveness of acidic chlorine dioxide-generating meat disinfectant solutions derives from the chlorous acid component, and that the undesirable skin effects observed with poultry and the like are attributable to the levels of chlorine dioxide in the solutions. In the practice of this invention, the formation of chlorine dioxide is suppressed by selecting certain acids to effectuate the formation of chlorous acid in solution and avoiding those acids which, by prescreening, are found to trigger the formation of excessive chlorine dioxide levels. Thus fresh meat products, notably poultry carcasses and carcass pieces, can be treated with metal chlorites in an acid solution to remove microorganisms during processing without discoloring the meat.

In the practice of this invention, microorganisms such as Salmonella are removed from fresh meat products such as poultry by contacting the meat with an aqueous solution containing from about 0.001% to about 0.2% by weight of a metal chlorite and sufficient amount of a pre-selected acid to adjust the pH of the solution to from about 2 to about 5, preferably from about 2.2 to about 4.5, to maintain the chlorite ion concentration in the form of chlorous acid to not more than about 35% by weight of the total amount of chlorite ion concentration in the solution, and to minimize chlorine dioxide generation.

The disinfectant solution of the invention may be contacted with the poultry or other meat product during any wash or dip processing step. For example, in a method for disinfecting poultry carcasses or poultry carcass pieces which comprises washing the carcasses or carcass pieces after evisceration, immersing each poultry carcass or carcass piece sequentially in a chilling tank, and removing the carcasses or pieces from the chilling tank, each poultry carcass or poultry carcass piece may be contacted with disinfectant solution during initial washing after evisceration, during immersion in the chill tank, during an optional spraying after removing from the chill tank, or during more than one of these processing steps.

In one embodiment, the solution is sprayed onto the whole animal carcass shortly after killing and evisceration. As discussed above, in poultry, a scalding and defeathering operation occurs before the evisceration. At this stage the animal carcass is still warm, and this heat can hasten the degradation of chlorous acid. Organic debris from the evisceration step can also promote such degradation. Therefore, a solution applied at this processing stage must have a higher level of chlorite and a higher proportion of chlorous acid than one applied in another embodiment, at the end of the processing line, where the carcass is cooler and carries less organic material which hastens the degradation of the chlorous acid. For application to the meat carcass shortly after evisceration, a solution containing chlorite ion in the concentration range of about 0.075% to about 0.150% by weight and having a pH range of about 2.4 to 3.0 is required.

For spray application at the end of the processing line of the whole carcass, or for sectioned carcass pieces, the spray solution should contain chlorite in the concentration range of from about 0.05% to about 0.1% by weight in a lesser proportion as chlorous acid, as determined by its higher pH range of from about 2.6 to 3.2. Specific experiments can be run on animal carcasses during typical in-plant operations, using formulations representing different concentration ranges and pH's in order to establish optimum effectiveness without excess usage of disinfecting chemicals. Specific examples are given hereinafter.

The application of the chlorous acid disinfecting system as a component of chill tank water for poultry requires a lower concentration of chlorite inasmuch as the contact time with the carcass approximates 1 hour or more. Longer contact time allows for the use of lesser concentrations of chlorite, and thereby lesser chlorous acid levels following reaction with acid. The level of chlorite for use in chill tank waters is from about 0.002% to about 0.02% or less by weight, at a pH of from about 2.8 to 3.2.

Different chlorous acid levels are needed to process poultry in different facilities, using birds of different histories, different cleanliness in operations, differing water supplies, and with chickens or turkeys of different masses requiring different cooling times. Therefore, specific trials are run in individual processing plants to establish the appropriate usage conditions. This is particularly important in U.S. operations, where a specific quantity of fresh water must be added as a replacement in the chill tank for every carcass introduced, e.g., ½ gallon discarded per bird. Thus, in addition to chemical consumed by the actual disinfection, ½ gallon of disinfecting chemical for each bird processed is discarded. In summary, the overall process is continuous and comprises immersing each carcass or carcass piece sequentially in the tank containing the chlorous acid solution, holding each to chill and disinfect it, removing it with a volume of solution, and adding an equivalent volume of fresh solution to the tank. Further replacement of disinfectant compounds must be made for this chlorite (as chlorous acid) and acid consumed by the disinfection. Specific examples are given hereinafter.

Any metal chlorites may be employed in the aqueous solutions of the invention, but water-soluble chlorites are preferred because they dissolve readily and are readily available and inexpensive. Typical water-soluble chlorites are alkali metal chlorites and alkaline earth metal chlorites. Sodium and potassium chorites or mixtures of these are particularly preferred. Sodium chlorite is used in many embodiments. Chlorite concentrations expressed as weight percent metal chlorite, alkali metal chlorite, or chlorite are given and defined herein as levels of sodium chlorite; use of other chlorites will require appropriate adjustment in levels.

The metal chlorites are dissolved in water with sufficient acid to adjust the pH to the levels described above, and to maintain the chlorite ion concentration in the form of chlorous acid to not more than about 35% by weight of the total amount of chlorite ion concentration in solution and to minimize chlorine dioxide generation so that the meat product is not discolored. Any protic acid can be used for converting chlorite to the disinfecting chlorous acid species under these conditions, provided that the formation of undesirable levels of chlorine dioxide are not generated, and will vary depending upon the mode of application and other factors. Inorganic acids are employed in some embodiments. For chill tanks, strong acids such as mineral acids or moderate strength acids such as phosphoric or sulfuric acid can be used in relatively small quantities to reduce the pH of the chlorite-containing water to the required level. While this is economical, particularly with respect to the discard loss, the constant influx of fresh water requires a close monitoring of solution pH in order for it to remain in a proper range to ensure relatively constant levels of chlorous acid.

Weaker acids such as malic acid may also be employed, so long as the acid can reduce th pH of the chlorite/chlorous acid solution to about 3.4 and below and chlorine dioxide concentrations are sufficiently low so the meat is not discolored. Use of food-grade acids such as citric or tartaric will minimize the effect of dilution, since higher levels will be needed initially to achieve the operative pH range for disinfection With $pK_a$'s for these acids in the ca. 3 range (1 molecule ionized for every 1000 present), pH variation upon dilution is markedly less than for strong or moderately strong acids. These may therefore be preferred acids for application of solution as a spray at the end of processing because, in the presence of chlorite, chlorous acid is continuously generated, and this continues the disinfectant process on the final meat product. On the other hand, these weaker acids are generally more expensive than the stronger acids, so these are not preferred for chill tanks because more acid must be discarded and replaced with the chlorite to maintain the appropriate concentrations of disinfectant compounds.

Some acids which are otherwise acceptable for forming the requisite amount of chlorous acid cannot be used because they yield undesirable levels of chlorine dioxide in solution. As has been discussed above, chlorine dioxide can react with amino acids such as tryptophan and tyrosine in proteins, yielding colored products that adversely affect the appearance of the poultry or meat carcass. Chlorine dioxide can also bleach cartenoid pigments in poultry fat and skin, and can react with subsurface hemoglobin in poultry and beef to form undesirable, brown methemoglobin. Normal commercial grade lactic acid and glycolic acid, for example, promote the formation of adverse colors when used in the method of this invention. As a guide to the acceptability of an acid and the adequacy of its technical purity, the acid is preferably selected to generate no more than about 2 ppm, and, in some cases, no more than about 1 ppm, of chlorine dioxide when mixed into a 0.1% by weight aqueous sodium chlorite solution to adjust the pH to about 2.95 ($\sim$2.95$\pm$0.2) and held for 30 minutes at about 25° C. ($\sim$25°$\pm$0.5° C.).

For chill tank use, it has been found that phosphoric acid, with a pK of about 2, and of a relatively low economic cost, represents a good balance of qualities. This acid can be used for spray application as well, for economic purposes, but the options available are greater since no liquid discard is required. Where the use of phosphoric acid is precluded, based on its potential for increasing phosphate levels in wastewater discharged to the environment, it has been found that any strong acid, such as sulfuric or hydrochloric acid, will serve quite adequately. Sulfuric acid is preferred in one embodiment. Mixtures of acids may also be employed.

The quantity of protic acid to be used to achieve the desired pH of the disinfecting solution for both spray and chill tank application will depend to some degree on the identity of the acid, i.e., its acid strength, as well as the characteristics of the local water in the plant. Alkaline waters will require a greater quantity of the acid to reduce the pH appropriately to the desired pH range of about 2.4 to 3.2 for spray applications and 2.8 to 3.2 for chill tanks. For example, when phosphoric acid is used for pH adjustment, in order to attain the appropriate level of chlorous acid, a quantity of about 0.3 liters of 85% $H_3PO_4$ is needed per 1000 gallons in chill tanks of low hardness, low alkaline water to achieve the requisite pH levels. Approximately double that quantity is needed for more alkaline waters. The same considerations apply for spray application liquids. Weaker acids are proportionately less affected by water alkalinity, since larger quantitites of acid are required to achieve the proper pH's, and the amount required to compensate for water alkalinity is relatively smaller.

It is necessary to avoid the addition of too much acid, and the resulting lowering of pH, since this hastens the degradation of chlorous acid and the formation of unwanted chlorine dioxide. At a pH of about 2.2, approximately 35% of the total chlorite in solution exists as the acid form $HClO_2$, chlorous acid. This decreases to about 20% at a pH of about 2.6, to about 10% at about pH 2.9, and to about 1% at about pH 4.0. Below a pH of about 2.2 to 2.4, depending on the level of chlorite for the use selected, the formation of chlorine dioxide becomes pronounced, according to the approximate equation:

$$\frac{d[ClO_2]}{dt} = K_1[HClO_2]^2 + K_2[HClO_2][ClO_2^-]$$

wherein $K_1$ and $K_2$ are rate constants and t is time. Thus, in the absence of other triggering impurities, the rate at which chlorine dioxide forms depends exponentially on the amount of chlorite ion which is converted to chlorous acid as well as on the amount of chlorous acid and free chlorite ion present. The variation in chlorine dioxide concentration that can be observed in solutions containing the same amount of a given metal chlorite at the same pH adjusted with different acids is illustrated hereafter. Chlorine dioxide formed by the action of extraneous substances is in excess of these amounts, and is also generally dependent on chlorous acid levels.

Preferred compositions of the invention economically balance the concentrations of reagents so that sufficient chlorous acid is generated to disinfect the meat while at the same time minimizing chlorine dioxide formation. The concentration of chlorine dioxide in chill tank solution is preferably below about 1 ppm upon immediate addition of chlorite and acid, and remains below that level during processing. Many preferred chill tank embodiments contain about 0.002% to about 0.15% by weight of a metal chlorite and sufficient strong inorganic acid to adjust the pH of the solution from about 2.4 to about 3.2. For spray applications, where the solution components are mixed immediately prior to application, little chlorine dioxide forms in the mixed solution. However, during residence on the meat, a solution containing inappropriate acids will form unwanted levels of chlorine dioxide.

In some embodiments, it is preferred that the solution comprising a metal chlorite and an acid contain a wetting agent to facilitate contact of the disinfecting agent with the surface of the meat. Any food-grade wetting agent that is not affected by the oxidative nature of the disinfectant is acceptable, as will be readily apparent to those skilled in the art. This group of wetting agents includes, but is not limited to, alkylphenoxypoly(ethylene oxides), poly(ethylene oxide/propylene oxide) block copolymers, alkylbenzene sulfonic acids, dioctylsulfosuccinates, and mixtures thereof.

For some embodiments, including a spray application of the disinfectant to meat carcasses, it is preferred that the solution comprising a metal chlorite and an acid contain a food-grade thickener to extend the effective time that the solutions remains on the meat to remove microorganisms. Food-grade thickeners are typically added in amounts sufficient to achieve a final solution viscosity of about 5 cps to about 50 cps at room temperature and pressure. Thickened solutions allow the chlorous acid disinfectant more time on the carcass so as to penetrate the biofilms produced by certain microorganisms, as well as the surface irregularities on the meat surfaces to effect a greater reduction in bacterial populations. A lowering of bacterial counts not only reduces or eliminates the numbers of pathogenic species but also increases the shelf life of the fresh meat product providing it is kept under standard refrigeration conditions.

The disinfectant solutions of this invention are applied to meat surfaces using various techniques. Since an aqueous acid solution and an aqueous metal chlorite solution may be mixed together to achieve a disinfectant solution of the invention, individual solutions of acid and metal chlorite can be directed into and through a spray head which mixes appropriate volumes of each liquid, producing an effluent spray containing the appropriate ingredients. Alternatively, two solutions can be premixed in a reservoir and thereafter a single liquid stream can be directed through a sprayer. Other means of applying solutions to carcasses or carcass pieces known in the art are encompassed by this invention.

For use in chill tank waters, where liquid is being continuously replaced by fresh water, it is necessary to replace the metal chlorite and protic acid levels as they are being discarded and reduced through their disinfecting action, and for this purpose acid is typically monitored using a pH meter and chlorite is monitored analytically. For the acid, a pH probe in the chill tank can be coupled with a servo-motor which directs a stream of acid solution to replenish the quantity lost and to maintain the proper pH. For the chlorite, an aliquot of the liquid from the chill tank can be directed into a mixing chamber into which an oxidizable material is introduced which produces a color that can be photometrically monitored and coupled with a similar drive mechanism to replenish the chlorite. Other standard means of dipping carcasses or carcass pieces into solution and monitoring solution ingredients are encompassed by this invention.

An advantage of the invention is that microorganisms can be efficiently and rapidly removed from meat surfaces without discoloring them. It is a further surprising advantage of the invention that, in some embodiments (including some illustrated hereafter), solutions of the invention preferentially reduce pathogenic microorganisms over non-pathogenic ones. In other embodiments, solutions of the invention destroy especially pathogenic microorganisms as effectively as wild-type strains.

Relatively low concentrations of disinfectant compounds are employed, so the invention is economical. Low solids levels in the disinfectant solutions results in less environmental impact in disposing of them. An additional advantage of using a metal chlorite and an acid for such disinfection purposes is that the active components can eventually degrade, to a major degree, into materials which are already present in and on the carcasses, or into non-pollutants. The chlorite degrades primarily to chloride. Where phosphoric acid is employed, it produces phosphates which are present in muscle tissue. Sulfuric acid yields sulfates. Food-grade acids yield simple, nontoxic organic anions.

The following examples are presented to further illustrate and explain the present invention and should not be taken as limiting in any regard. Unless otherwise indicated, all parts and percentages are by weight, and are based on the weight at the particular stage of the processing being described. The abbreviation "ATCC" denotes the American Type Culture Collection.

EXAMPLE 1

This example illustrates a reduction of levels of total aerobic bacteria, total coliforms and, in particular, *Escherichia coli*, on the surfaces of heavily contaminated chicken carcasses by immersing them in chill tanks containing compositions of the invention.

Sixty carcasses, weighing about 4 lbs each, from 7-week-old chickens, were defeathered, eviscerated, and sprayed with water before subdividing them into four groups of 15 carcasses each. They were then immersed for one hour in one of the four following solutions, maintained throughout at ≦40° F.:

Group 1 Tap water, non-chlorinated, pH 7.34
Group 2 Tap water containing 75.8 mg/liter sodium chlorite and 142 mg/liter phosphoric acid, pH 3.14
Group 3 Tap water containing 67.3 mg/liter sodium chlorite and 136 mg/liter phosphoric acid, pH 3.14
Group 4 Tap water containing 60.6 mg/liter sodium chlorite and 132 mg/liter phosphoric acid, pH 3.17

After immersion, the carcasses were rinsed in a mechanical shaker with sterile peptone broth containing 0.2% sodium thiosulfate, and the rinse liquids were then evaluated microbiologically for bacteria. The average bacterial counts, total coliforms, and *E. coli* counts, and their percentage reductions with respect to the counts in control group 1 are shown below.

| Group | Total Aerobic Plate Counts | | Total Coliforms | | E. coli | |
|---|---|---|---|---|---|---|
| | Average | % Reduction | Average | % Reduction | Average | % Reduction |
| 1 | 93,972 | — | 13,696 | — | 11,353 | — |
| 2 | 15,560 | 83.4% | 399 | 97.1% | 248 | 97.8% |
| 3 | 18,750 | 80.0% | 1,825 | 86.7% | 893 | 92.1% |
| 4 | 23,121 | 75.4% | 725 | 94.7% | 554 | 95.1% |

The surface texture and appearance of all the carcasses were normal and showed no evidence of bleaching and skin discoloration.

EXAMPLE 2

This example illustrates a reduction in the levels of total coliforms and *E. coli* in stored poultry parts by brief immersion in solutions containing compositions of this invention.

After deboning and skinning, 200 chicken legs were subdivided into 4 groups of 50 legs each. They were immersed for 5 to 10 seconds at about 18° C. in one of the four solutions described below and allowed to drip dry.

Group 1 Tap water, non-chlorinated, pH 7.25
Group 2 Tap water containing 303 mg/liter sodium chlorite and 846 mg/liter phosphoric acid, pH 2.55
Group 3 Tap water containing 606 mg/liter sodium chlorite and 870 mg/liter phosphoric acid, pH 2.58
Group 4 Tap water containing 1165 mg/liter sodium chlorite and 892 mg/liter phosphoric acid, pH 2.57

Eight legs from each group were immediately rinsed with microbiological broth containing 0.2% sodium thiosulfate, after which the liquids were evaluated for total coliforms and *E. coli* bacteria. The remaining legs from all groups were stored under refrigeration at about 35° F., and sampled on days 1, 3, 5, and 7 for bacterial counting.

The results of these studies are tabulated below. In the table, the total average number of organisms of each type are shown for each treatment, corresponding to the number of days stored. The percentage reduction of these initial organism counts are shown in parenthesis with respect to the bacterial numbers for the control group on that day; ns=not significantly different from the control.

| Day | Total Coliforms | | | | E. coli | | | |
|---|---|---|---|---|---|---|---|---|
| | Grp. 1 | Grp. 2 | Grp. 3 | Grp. 4 | Grp. 1 | Grp. 2 | Grp. 3 | Grp. 4 |
| 0 | 3.1 | 5.9 | 3.9 | 5.8 | 0.34 | 0.19 | 0.23 | 0.11 |
| | — | (ns) | (ns) | (ns) | — | (ns) | (ns) | (ns) |
| 1 | 1.75 | 1.83 | 1.41 | 2.7 | 0.39 | 0.33 | 0.12 | 0.12 |
| | — | (ns) | (ns) | (ns) | — | (ns) | (ns) | (ns) |
| 3 | 18.2 | 26.3 | 19.8 | 7.5 | 1.11 | 2.17 | 0.63 | 0.33 |
| | — | (ns) | (ns) | (59%) | — | (ns) | (ns) | (ns) |
| 5 | 194 | 86 | 115 | 39 | 15.1 | 65.2 | 8.1 | 15.5 |
| | — | (55.7%) | (40.7%) | (79.7%) | — | (ns) | (ns) | (ns) |
| 7 | 1035 | 479 | 3.0 | 9.8 | 615 | 372 | 218 | 62.5 |
| | — | (53.7%) | (99.7%) | (98.4%) | — | (39.5%) | (64.6%) | (89.8%) |

It can be seen that contact with solutions prepared according to the invention was sufficient to reduce both total coliform and *E. coli* levels on the stored chicken thighs from day 3 and thereafter, with greater reductions in bacterial proliferation generally corresponding to increased concentrations of chlorite in the dip solution. No deleterious effects on the poultry meat surfaces were observed.

EXAMPLE 3

This example illustrates that solutions prepared according to the present invention rapidly destroy *Salmonella typhimurium* and *Campylobacter jejuni*, two organisms of significant concern in the poultry industry.

One milliliter inocula of cultures of *Salmonella typhimurium* (ATCC 14028), $1.6 \times 10^6$ cfu/ml, and *Campylobacter jejuni* (ATCC 33560), $1.6 \times 10^7$ cfu/ml, were added to 500-ml volumes of each of the following compositions:

1) 151.2 mg of sodium chlorite and 423 mg phosphoric acid
2) 582.5 mg sodium chlorite and 446 mg phosphoric acid The solutions were contacted for the times indicated below, and the solutions neutralized by adding 0.1% sodium thiosulfate and then incubated at 38° C. prior to counting the number of microorganisms.

The results are summarized as follows:

|  | S. typhimurium | | C. jejuni | |
|---|---|---|---|---|
|  | Test 1 | Test 2 | Test 1 | Test 2 |
|  | (cfu/ml) | | (cfu/ml) | |
| Initial inoculum | 3,200 | 3,200 | 24,000 | 24,000 |
| After 30 seconds | 0 | 0 | 0 | 0 |
| After 1 hour | 0 | 0 | 0 | 0 |

The data show both organisms were rapidly destroyed.

EXAMPLE 4

This example illustrates that compositions prepared according to the present invention reduce the levels of Campylobacter organisms on the surface of poultry carcasses by either brief immersion in higher concentrations of bacteriocidal solution, or by a one-hour immersion in chill tank processing water containing more dilute concentrations.

One hundred carcasses weighing about 3 pounds each were taken immediately from a poultry processing plant directly after spray washing following evisceration. While still warm, they were divided into 5 groups of 20 carcasses each, and treated with one of the following solutions:

Group 1 (Control)—Tap water, non-chlorinated
Group 2 (Dip-Test)—Tap water containing 1165 ppm of sodium chlorite and 892 ppm phosphoric acid
Group 3 (Chill Tank, Test A)—Tap water containing 150 ppm of sodium chlorite and 245 ppm of phosphoric acid
Group 4 (Chill Tank, Test B)—Tap water containing 100 ppm of sodium chlorite and 229 ppm of phosphoric acid
Group 5 (Chill Tank, Test C)—Tap water containing 60 ppm of sodium chlorite and 158 ppm of phosphoric acid After immersion, either for about 5 seconds at 55° F. for groups 1 and 2 or for 1 hour at 35°–40° F. for groups 3 to 5, the carcasses were rinsed in a mechanical shaker with sterile peptone broth containing 0.2% sodium thiosulfate and the rinse liquids were evaluated microbiologically for total Campylobacter organisms. The average numbers for the 20 carcasses per group are shown in the following table, with percentage reductions of the organisms on the treated groups with respect to the corresponding water control carcasses.

|  | Campylobacter Organisms | |
|---|---|---|
| Treatment Group | Number/carcass | % Reductions |
| 1 - Dip Control | 3,750 | — |
| 2 - Dip Test | 149 | 96.0% |
| 3 - Chill Test A | 92 | 97.5% |
| 4 - Chill Test B | 286 | 92.4% |
| 5 - Chill Test C | 1,146 | 69.4% |

The results demonstrate that the solutions of the invention can destroy a high percentage of pathogenic Campylobacter microorganisms.

EXAMPLE 5

This example illustrates that the inventive compositions reduce total coliform and *E. coli* microorganism counts of poultry carcasses by brief immersion or by exposure of the carcasses during processing in a chill tank containing the solutions of the invention.

The carcasses exposed under conditions described in Example 4 above were also evaluated microbiologically for total aerobic counts, as well as for both total coliforms and *E. coli* organisms. The results are presented below, expressed as absolute numbers and percentages with respect to the control group, as well as with respect to the number of total aerobic organisms per carcass surface following each treatment.

| Treatment Group | Aerobic Plate Count | Total Coliforms | E. coli | % [E. coli + Coliforms] with respect to Plate Count |
|---|---|---|---|---|
| 1 - Control | 5,847 | 59.3 | 173 | 3.97% |
| 2 - Dip Test | 2,705 | 2.2 | 1.6 | 0.14% |
|  | (53.7%) | (96.3%) | (99.1%) |  |
| 3 - Test A | 1,320 | 11.0 | 1.0 | 0.50% |
|  | (77.4%) | (81.5%) | (99.4%) |  |
| 4 - Test B | 2,428 | 3.6 | 3.8 | 0.30% |
|  | (58.5%) | (93.9%) | (97.8%) |  |
| 5 - Test C | 4,662 | 5.5 | 5.7 | 0.24% |
|  | (20.3%) | (90.7%) | (96.7%) |  |

The data illustrate significant reduction of pathogenic microorganisms on poultry carcasses, as well as the greater proportionate reduction of these organisms than the total aerobic flora. For example, for treatment 5, where only about 20% of the total organisms were reduced, the reduction in both coliform groups was 90.7% and 96.7%. And the fraction of total organisms that were all coliforms fell from about 4% to about 0.24%.

EXAMPLE 6

This example illustrates the use of the present invention to reduce the number of Salmonella-positive chicken carcasses by means of a brief "pre-chill tank" exposure of the carcasses prior to their subsequent processing.

After normal processing in a poultry plant up to postevisceration washing, 80 carcasses of about 3-lb chickens, while still warm, were divided into 4 groups of 20 carcasses each, and briefly immersed into one of the four following solutions:

Group 1 (Control)—Tap water, non-chlorinated

Group 2 (Pre-chill, Test A)—Tap water containing 2331 ppm of sodium chlorite and 1789 ppm of phosphoric acid Group 3 (Pre-chill, Test B)—Tap water containing 1165 ppm of sodium chlorite and 895 ppm phosphoric acid Group 4 (Pre-chill, Test C)—Tap water containing 583 ppm of sodium chorite and 447 ppm phosphoric acid After immersion of the carcasses for about 5 seconds at about 55° F. in one of these solutions, they were rinsed in a mechanical shaker with sterile peptone broth containing 0.2% sodium thiosulfate, and the rinse liquids were then evaluated microbiologically for the presence or absence of Salmonella organisms. The results are tabulated below as the fraction of Salmonella-positive carcasses corresponding to each treatment:

| Treatment Group | Salmonella Positive Carcasses | % Salmonella Positive |
|---|---|---|
| 1 - Control | 7/20 | 35% |
| 2 - Test A | 1/20 | 5% |
| 3 - Test B | 1/20 | 5% |
| 4 - Test C | 3/20 | 15% |

The number of Salmonella-positive poultry carcasses are significantly reduced.

EXAMPLE 7

This example illustrates that compositions of the invention can destroy a virulent strain of *E. coli* as well as a more common strain.

Freshly prepared duplicate formulations containing 60.4 ppm sodium chlorite and 64 ppm phosphoric acid in deionized water (final pH=3.1) were inoculated with *E. coli* strain 0157:H7 (from Tyson Foods) and ATCC strain 8739 to final levels of $2.2 \times 10^7$ cfu/ml. After 1, 2, 3, 4, 6, 8, 16 and 32 minutes, aliquots were neutralized, plated out on trypticase soy agar, and incubated overnight at 32° C. before counting the organisms.

The results obtained are as follows:

| Strain | Log Reductions of *E. coli* Strains | | | | | | | |
|---|---|---|---|---|---|---|---|---|
| | 1' | 2' | 3' | 4' | 6' | 8' | 16' | 32' |
| 0157:H7 | <1 | 1.7 | 2.3 | 2.8 | 4.3 | 4.6 | 5.5 | >6.4 |
| ATCC-8739 | <1 | 1.5 | 2.7 | 2.8 | 4.1 | 5.1 | >6.3 | >6.3 |

Both strains of *E. coli* are effectively destroyed at approximately the same rate by the formulation.

EXAMPLE 8

This example illustrates the destruction of various microorganisms using a formulation of the invention containing sulfuric acid in place of phosphoric acid.

Freshly prepared solutions containing 60.4 ppm sodium chlorite and 64 ppm phosphoric acid in deionized water, pH 3.1, denoted "A" below, and solutions containing 60.4 ppm sodium chlorite and 47 ppm sulfuric acid, pH 3.1, denoted "B" below, were inoculated with *E. coli* strains 0157:H7, $2.0 \times 10^7$ cfu/ml; and ATCC-8739, $2.5 \times 10^7$ cfu/ml, (described in Example 7 above); *Listeria monocytogenes* (V7 type 1A), $1.6 \times 10^7$ cfu/ml; or *Salmonella choleraesuis* (ATCC 10708), $2.5 \times 10^7$ cfu/ml. After 1-, 2-, 3-, 4-, 6-, 8-, 16- and 32-minute contacts at ambient temperature, aliquots were taken, neutralized, plated out on appropriate media, and incubated at 32° C. for *E. coli* and 37° C. for the other organisms to obtain the following counts:

| Strain | Soln. | Log Reductions of Pathogens | | | | | | | |
|---|---|---|---|---|---|---|---|---|---|
| | | 1' | 2' | 3' | 4' | 6' | 8' | 16' | 32' |
| *E. coli* 0157:H7 | A | 1.5 | 2.05 | 2.36 | 2.57 | 2.84 | 3.07 | 3.74 | 4.60 |
| | B | 1.6 | 2.12 | 2.44 | 2.62 | 2.87 | 3.04 | 3.71 | 5.05 |
| *E. coli* ATCC-8739 | A | 0.85 | 1.30 | 1.63 | 1.92 | 2.48 | 3.00 | 4.73 | 7.40 |
| | B | 0.72 | 1.22 | 1.55 | 1.82 | 2.20 | 2.52 | 3.82 | 6.42 |
| *S. choleraesuis* | A | 0.95 | 1.60 | 2.10 | 2.70 | 3.50 | 4.34 | 7.4 | |
| | B | 0.85 | 1.48 | 1.92 | 2.40 | 3.17 | 4.00 | 7.4 | |
| *L. monocytogenes* | A | 0.43 | 0.83 | 1.12 | 1.33 | 1.67 | 1.90 | 2.75 | 4.60 |
| | B | 0.53 | 0.96 | 1.24 | 1.47 | 1.76 | 1.90 | 2.37 | 3.33 |

It can be seen that both phosphoric acid- and sulfuric acid-activated solutions were comparably effective in destroying the pathogenic microorganisms tested.

EXAMPLE 9

This example compares and contrasts the generation of chlorine dioxide by different commercial grade acids when exposed to standard sodium chlorite solutions.

For a solution containing 1,000 parts per million (0.1%) of sodium chlorite adjusted to pH 2.96 with one of the four acids listed below, the levels of chlorine dioxide formed 30 minutes after mixing are as follows:

| acid | chlorine dioxide |
|---|---|
| sulfuric acid | 0.7 ppm |
| phosphoric acid | 0.8 ppm |
| lactic acid | 2.7 ppm |
| glycolic acid | 24.4 ppm |

It can be seen that from solutions containing equal levels of chlorous acid, lactic acid generates 3 to 4 times as much chlorine dioxide as does phosphoric or sulfuric acid, while glycolic generates about 30 times more. Since chlorine dioxide causes undesirable skin discoloration in poultry disinfectant solutions, lactic acid and glycolic acid are not used in the practice of this invention.

Higher concentrations of chlorite generate higher levels of chlorine dioxide in solution, and the effects are the same. For a 2500 ppm sodium chlorite solution at pH 2.6, levels of chlorine dioxide, generated 30 minutes after mixing with different acids, are as follows:

| acid | chlorine dioxide |
|---|---|
| sulfuric acid | 33 ppm |
| phosphoric acid | 27 ppm |
| lactic acid | 79 ppm |

Chlorine dioxide generation with all acids under these concentration and pH conditions is in excess of preferable ranges for meat disinfection, and again lactic acid creates more chlorine dioxide than other acids from equivalent levels of chlorous acid in solution.

EXAMPLE 10

This example compares carcasses treated with a composition of the invention containing chlorite and food-grade phosphoric acid and carcasses treated with a composition containing chlorite and food-grade lactic acid. The conditions described simulate a spray application of solution to chicken carcasses on a poultry processing line.

Three sets of chicken carcasses, each about 2 lbs, were purchased from a supermarket and inoculated with *Salmonella typhimurium* (ATCC 14028) by immersion in a broth containing ca. $5 \times 10^5$ cfu/ml of organisms for 45 minutes. The carcasses were then dipped for 5 seconds in either tap water or in two concentrations of lactic or phosphoric acid-activated chlorite solutions described below, which had been prepared 1 hour prior to use (using 55° F. non-chlorinated water).

Lactic Acid Solutions:
A. sodium chlorite 0.1165%, lactic acid 0.643%, pH=2.49
B. sodium chlorite 0.0583%, lactic acid 0.322%, pH=2.60

Phosphoric Acid Solutions:
A. sodium chlorite 0.1165%, phosphoric acid 0.0362%, pH 2.49
B. sodium chlorite 0.0583%, phosphoric acid 0.0347%, pH 2.60

After dipping, the carcasses were allowed to drip for 10 minutes prior to visual evaluation.

The surface texture and appearance of the carcasses that had been immersed in water (control) and in both phosphoric acid-activated chlorite solutions were normal and unremarkable. Of the carcasses that had been immersed in the lactic acid-activated solutions, those exposed to the higher concentration formulation, at lower pH, showed distinct bleaching of portions of fat near the tail, an overall lighter color on the skin, and random brownish-tinged areas. The carcasses exposed to the lower concentration lactic acid system were characterized by an overall lighter coloration and fainter yellow fat portion.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention, which is defined by the claims that follow. The claims are meant to cover the claimed components and steps in any sequence which is effective to meet the objectives there intended, unless the context specifically indicates the contrary.

I claim:

1. A method for disinfecting poultry carcasses or poultry carcass pieces comprising:
   (1) washing the carcasses or carcass pieces after evisceration;
   (2) immersing each poultry carcass or carcass piece sequentially in a chilling tank; and
   (3) removing the carcasses or pieces from the chilling tank wherein each poultry carcass or poultry carcass piece is contacted with an aqueous solution containing about 0.001% to about 0.2% by weight of a metal chlorite and sufficient acid to adjust the pH of the solution to about 2.2 to about 4.5, to maintain the chlorite ion concentration in the form of chlorous acid to not more than about 35% by weight of the total amount of chlorite ion concentration in the solution, said acid being selected in an independant test such that, when mixed into a 0.1% by weight aqueous sodium chlorite solution to adjust the pH to about 2.95 and held for 30 minutes at about 25° C., no more than about 2 ppm chlorine dioxide are generated so that, significant discoloration of the poultry is minimized, said contact occurring during processing steps selected from the group consisting of initial washing after evisceration, immersion in the chill tank, and a mixture of these steps.

2. A method according to claim 1 wherein the solution is contacted with the carcasses or carcass pieces in the chill tank, a volume of the solution is removed from the tank and discarded when each carcass or carcass piece is removed from the tank, and an equivalent volume of fresh water and disinfecting compounds are added to the tank.

3. A method according to claim 2 wherein the pH of the solution in the tank is monitored using a pH meter and the chlorite ion concentration is analytically monitored.

4. A method according to claim 1 wherein the metal chlorite is an alkali metal selected from the group consisting of sodium chlorite, potassium chlorite, and mixtures thereof, and the acid is selected from the group consisting of phosphoric acid, sulfuric acid, hydrochloric acid, and mixtures thereof.

5. A method according to claim 4 wherein the solution contains about 0.002% to about 0.02% alkali metal chlorite and has a pH of about 2.8 to about 3.2.

6. A method according to claim 4 wherein the acid is sulfuric acid.

7. A method according to claim 1 wherein the solution is sprayed on the carcasses or carcass pieces during the wash after evisceration.

8. A method according to claim 7 wherein the solution contains about 0.075% to about 0.15% by weight alkali metal chlorite and has a pH of about 2.4 to about 3.0.

9. A method according to claim 1 wherein the solution is sprayed on the carcasses or carcass pieces during a spray wash after removing them from the chill tank.

10. A method according to claim 9 wherein the solution contains about 0.05% to about 0.1% by weight alkali metal chlorite and has a pH of about 2.6 to about 3.2.

11. A method according to claim 1 wherein each poultry carcass or poultry carcass piece is sprayed after removal from the chill tank.

12. A method according to claim 1 wherein the acid is an inorganic acid.

13. A method for the removal of microorganisms from a fresh meat product comprising contacting the meat with an aqueous solution containing about 0.001% to about 0.2% by weight of a metal chlorite and sufficient acid to adjust the pH of the solution to about 2.2 to about 4.5, and to maintain the chlorite ion concentration in the form of chlorous acid to not more than about 35% by weight of the total amount of chlorite ion concentration in the solution, said acid being selected in an independent test such that, when mixed into a 0.1% by weight aqueous sodium chlorite solution to adjust the pH to about 2.95 and held for 30 minutes at about 25° C. no more than about 2 ppm chlorine dioxide are generated.

14. A method according to claim 13 wherein the acid is selected to generate no more than about 1 ppm chlorine dioxide under the same conditions.

15. A method according to claim 13 wherein the metal chlorite is an alkali metal chlorite and the acid is an inorganic acid selected from the group consisting of phosphoric acid, sulfuric acid, hydrochloric acid, and mixtures thereof.

16. A method according to claim 13 wherein the fresh meat product is a poultry carcass or poultry carcass pieces, the solution contains about 0.002% to about 0.15% alkali metal chlorite, the pH is about 2.4 to about 3.2, and the acid is a strong inorganic acid.

17. A method according to claim 13 wherein acid is sulfuric acid.

18. A liquid composition for removing microorganisms from poultry comprising water, about 0.001% to about 0.2% by weight water-soluble metal chlorite, and sufficient acid to adjust the pH of the solution to about 2.2 to 4.5 and to maintain the chlorite ion concentration in the form of chlorous acid to not more than about 35% by weight of the total amount of chlorite ion concentration, said acid being selected in an independent test such that, when mixed into a 0.1% by weight aqueous sodium chlorite solution to adjust the pH to about 2.95 and held for 30 minutes at about 25° C. no more than about 2 ppm chlorine dioxide are generated so that the poultry is not significantly discolored.

19. A composition according to claim 18 wherein no more than about 1 ppm chlorine dioxide is generated under the same conditions.

20. A composition according to claim 18 wherein the acid is a inorganic acid.

21. A composition according to claim 20 wherein the acid is selected from the group consisting of phosphoric acid, sulfuric acid, hydrochloric acid, and mixtures thereof.

22. A composition according to claim 21 wherein the acid is selected from the group consisting of sulfuric acid and phosphoric acid.

23. A composition according to claim 18 wherein the watersoluble metal chlorite is sodium chlorite.

24. A composition according to claim 23 wherein the alkali metal chlorite is sodium chlorite.

* * * * *